United States Patent
Gao et al.

(10) Patent No.: US 9,998,357 B2
(45) Date of Patent: Jun. 12, 2018

(54) MULTIPATH TRANSMISSION BASED PACKET TRAFFIC CONTROL METHOD AND APPARATUS

(71) Applicant: HUAWEI TECHNOLOGIES CO., LTD., Shenzhen (CN)

(72) Inventors: Peng Gao, Beijing (CN); Zhenhai Li, Shenzhen (CN); Zhenxiao Liu, Beijing (CN); Tao Bai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 14/940,496

(22) Filed: Nov. 13, 2015

(65) Prior Publication Data
US 2016/0072702 A1 Mar. 10, 2016

Related U.S. Application Data

(63) Continuation of application No. PCT/CN2014/072732, filed on Feb. 28, 2014.

(30) Foreign Application Priority Data

May 14, 2013 (CN) .......................... 2013 1 0177276

(51) Int. Cl.
*H04L 12/707* (2013.01)
*H04L 12/803* (2013.01)
(Continued)

(52) U.S. Cl.
CPC .......... *H04L 45/24* (2013.01); *H04L 45/7453* (2013.01); *H04L 47/125* (2013.01); *H04L 47/20* (2013.01); *H04L 69/22* (2013.01)

(58) Field of Classification Search
None
See application file for complete search history.

(56) References Cited

U.S. PATENT DOCUMENTS 7,206,861 B1    4/2007   Callon
2001/0047409 A1*   11/2001   Datta .................. H04L 41/0813
                                                       709/224

(Continued)

OTHER PUBLICATIONS

J. Heinanen et al., "A Single Rate Three Color Marker," Network Working Group, Sep. 1999, pp. 1-6.

(Continued)

*Primary Examiner* — Hassan Phillips
*Assistant Examiner* — Gautam Sharma
(74) *Attorney, Agent, or Firm* — Staas & Halsey LLP

(57) ABSTRACT

Embodiments of the present application disclose a multipath transmission based packet traffic control method, including: monitoring egress traffic of a data packet set sent by a source node; determining, according to a preconfigured mapping relationship between traffic ranges and forwarding paths, a target forwarding path set corresponding to the egress traffic of the data packet set, and a weight parameter of the egress traffic borne on each target forwarding path in the target forwarding path set; and distributing the data packet set according to the weight parameter, and transferring the data packet set to a destination node by the target forwarding path set. The embodiments of the present application further disclose a traffic control apparatus. By using the present application, centralized policing and classification can be performed on user traffic in a multipath transmission scenario.

10 Claims, 5 Drawing Sheets

(51) Int. Cl.
*H04L 12/743* (2013.01)
*H04L 12/813* (2013.01)
*H04L 29/06* (2006.01)

(56) References Cited

U.S. PATENT DOCUMENTS

| | | | | |
|---|---|---|---|---|
| 2002/0174279 | A1* | 11/2002 | Wynne | G06F 9/468 |
| | | | | 710/107 |
| 2002/0176358 | A1* | 11/2002 | Assa | H04L 12/4633 |
| | | | | 370/229 |
| 2003/0219026 | A1* | 11/2003 | Sun | H04L 47/20 |
| | | | | 370/412 |
| 2003/0233248 | A1* | 12/2003 | Shingu | G06Q 30/02 |
| | | | | 703/7 |
| 2004/0042398 | A1* | 3/2004 | Peleg | H04L 47/11 |
| | | | | 370/230 |
| 2004/0066785 | A1* | 4/2004 | He | H04L 12/5601 |
| | | | | 370/395.21 |
| 2006/0291392 | A1 | 12/2006 | Alicherry et al. | |
| 2008/0279207 | A1* | 11/2008 | Jones | H04L 47/20 |
| | | | | 370/412 |
| 2012/0201252 | A1* | 8/2012 | Subramanian | H04L 45/125 |
| | | | | 370/401 |

OTHER PUBLICATIONS

J. Heinanen et al., "A Two Rate Three Color Marker," Network Working Group, Sep. 1999, pp. 1-5.
Aboul-Magd et al. "A Differentiated Service Two-Rate, Three-Color Marker with Efficient Handling of in-Profile Traffic," Network Working Group, Jul. 2005, pp. 1-6.
"Technical Specification MEF 10 Ethernet Services Attributes Phase 1 (Obsoletes MEF 1 and MEF 5)," Metro Ethernet Forum, Nov. 2004, pp. 1-32 with 5 cover sheets.
PCT International Search Report dated Jun. 9, 2014 in corresponding PCT Application No. PCT/CN2014/072732.
Chinese Office Action and Search Report dated Jul. 3, 2015 in corresponding Chinese Patent Application No. 201310177276.2.
Extended European Search Report dated Apr. 4, 2016 in corresponding European Patent Application No. 14797188.1.
International Search Report dated Jun. 9, 2014, in corresponding International Application No. PCT/CN2014/072732.

* cited by examiner

MULTIPATH TRANSMISSION BASED PACKET TRAFFIC CONTROL METHOD AND APPARATUS

CROSS-REFERENCE TO RELATED APPLICATIONS

This application is a continuation of International Application No. PCT/CN2014/072732, filed on Feb. 28, 2014, which claims priority to Chinese Patent Application No. 201310177276.2, filed on May 14, 2013, both of which are hereby incorporated by reference in their entireties.

TECHNICAL FIELD

The present application relates to the field of communications, and in particular, to a multipath transmission based packet traffic control method and apparatus.

BACKGROUND

In a data communications network, traffic models mostly belong to a burst mode. Therefore, some network traffic limiting methods need to be used to avoid many problems caused by bursty traffic to the network, such as network congestion. A common traffic policing method is based on a token bucket. For a packet processing behavior of the token bucket, multiple token bucket algorithms are defined in the prior art, such as a single rate three color marker (single rate three color marker, srTCM) algorithm and a two rate three color marker (two rate three color marker, trTCM) algorithm, and in assessment results of the algorithms, a packet is marked with a red color, a yellow color, or a green color. A traffic policing apparatus sets a discarding priority of a packet according to a color of the packet. The single rate three color marker is more concerned with a packet size burst, and the two rate three color marker is more concerned with a rate burst. Both of the algorithms can work in a color-blind mode and a non-color-blind mode. However, the traffic policing method based on the token bucket can be based on only one path. In existing network applications, multipath transmission, such as dual-homing networking and load balancing, is a mainstream networking method, and there are multiple transmission paths between a source node and a destination node. In the prior art, if traffic of a same user passes through multiple paths, traffic policing cannot cover the user traffic.

SUMMARY

The technical problem to be resolved by embodiments of the present application is to provide a multipath transmission based packet traffic control method and apparatus, so as to resolve a problem in the prior art that user traffic cannot be policed in a multipath transmission scenario.

To resolve the foregoing technical problem, a first aspect of the present application provides a multipath transmission based packet traffic control method, where the method includes:

monitoring egress traffic of a data packet set sent by a source node;

determining, according to a preconfigured mapping relationship between traffic ranges and forwarding paths, a target forwarding path set corresponding to the egress traffic of the data packet set, and a weight parameter of the egress traffic borne on each target forwarding path in the target forwarding path set; and distributing the data packet set according to the weight parameter, and transferring the data packet set to a destination node by the target forwarding path set.

In a first possible implementation manner, the monitoring egress traffic of a data packet set sent by a source node includes:

sending, to a concentration device, statistical information of the data packet set sent by the source node; and acquiring the egress traffic of the data packet set, where the egress traffic of the data packet set is calculated by the concentration device according to the statistical information.

With reference to the first aspect and the first possible implementation manner, in a second possible implementation manner, before the monitoring egress traffic of a data packet set sent by a source node, the method further includes:

configuring the mapping relationship between traffic ranges and forwarding paths, where traffic ranges do not overlap between each other, and path forwarding quality of a forwarding path corresponding to a traffic range with a small value is higher than that of a forwarding path corresponding to a traffic range with a large value.

With reference to the second possible implementation manner of the first aspect, in a third possible implementation manner, the distributing the data packet set according to the weight parameter, and transferring the data packet set to a destination node by the target forwarding path set includes:

extracting characteristic information of each data packet in the data packet set;

performing a hash operation on the characteristic information of each data packet in the data packet set separately to obtain a hash value;

calculating, according to the weight parameter of each target forwarding path and a maximum value of the hash operation, a hash value band-pass range corresponding to each target forwarding path; and determining, according to the hash value of each data packet in the data packet set and the hash value band-pass range, the target forwarding path corresponding to each data packet.

With reference to the third possible implementation manner of the first aspect, in a forth possible implementation manner, the characteristic information of the data packet includes header information of the data packet and/or load information of the data packet.

With reference to the forth possible implementation manner of the first aspect, in a fifth possible implementation manner, the method further includes:

discarding, if the egress traffic of the data packet set sent by the source node is greater than rated traffic between the source node and the destination node, a data packet, exceeding the rated traffic, in the data packet set.

Correspondingly, a second aspect of the present application further provides a multipath transmission based packet traffic control apparatus, where the apparatus includes:

a traffic monitoring module, configured to monitor egress traffic of a data packet set sent by a source node;

a path determining module, configured to determine, according to a preconfigured mapping relationship between traffic ranges and forwarding paths, a target forwarding path set corresponding to the egress traffic of the data packet set, and a weight parameter of the egress traffic borne on each target forwarding path in the target forwarding path set; and a packet sending module, configured to distribute the data packet set according to the weight parameter, and transfer the data packet set to a destination node by the target forwarding path set.

In a first possible implementation manner, the traffic monitoring module includes:

an information sending unit, configured to send, to a concentration device, statistical information of the data packet set sent by the source node; and a traffic acquiring unit, configured to acquire the egress traffic of the data packet set, where the egress traffic is of the data packet set calculated by the concentration device according to the statistical information.

With reference to the second aspect and the first possible implementation manner, in a second possible implementation manner, the apparatus further includes:

a configuration module, adapted to configure the mapping relationship between traffic ranges and forwarding paths, where traffic ranges do not overlap between each other, and path forwarding quality of a forwarding path corresponding to a traffic range with a small value is higher than that of a forwarding path corresponding to a traffic range with a large value.

With reference to the second possible implementation manner of the second aspect, in a third possible implementation manner, the packet sending module further includes:

a characteristic extraction unit, configure to extract characteristic information of each data packet in the data packet set;

a hash operation unit, configured to perform a hash operation on the characteristic information of each data packet in the data packet set separately to obtain a hash value;

a range calculating unit, configured to calculate, according to the weight parameter of each target forwarding path and a maximum value of the hash operation, a hash value band-pass range corresponding to each target forwarding path; and a packet classification unit, configured to determine, according to the hash value of each data packet in the data packet set and the hash value band-pass range, the target forwarding path corresponding to each data packet, and transfer each data packet to the destination node.

With reference to the third possible implementation manner of the second aspect, in a forth possible implementation manner, the characteristic information of the data packet includes header information of the data packet and/or load information of the data packet.

With reference to the forth possible implementation manner of the second aspect, in a fifth possible implementation manner, the apparatus further includes:

a traffic limiting module, configured to discard, if the egress traffic of the data packet set sent by the source node is greater than rated traffic between the source node and the destination node, a data packet, exceeding the rated traffic, in the data packet set.

Implementation of the present application has the following beneficial effects:

In a multipath scenario, statistics about egress traffic of a data packet set sent by a source node is collected; a weight parameter of the egress traffic is determined according to a preconfigured mapping relationship between traffic ranges and forwarding paths; and the data packet set is redistributed to a corresponding target forwarding path according to the weight parameter, so that policing and classification of packet traffic in the multipath scenario is implemented.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 2:
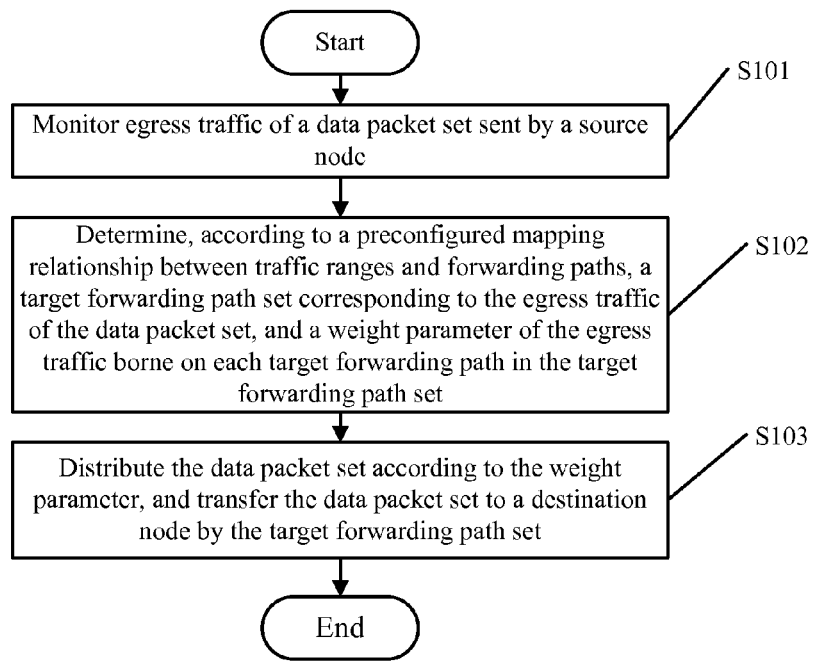
FIG. 2 is a schematic flowchart of a multipath transmission based packet traffic control method according to an embodiment of the present application.

FIG. 2 is a schematic flowchart of a multipath transmission based packet traffic control method according to an embodiment of the present application, where the method includes:

S101: Monitor egress traffic of a data packet set sent by a source node.

Specifically, there may be multiple forwarding paths between the source node and a destination node; the source node sends a data packet of a user to the destination node by the multiple forwarding paths; the source node correspondingly has multiple output ports; and a traffic control apparatus monitors traffic of data packet sets sent by the multiple output ports of the source node, and obtains egress traffic of the data packet sets by adding the traffic of each output port.

Figure 1:
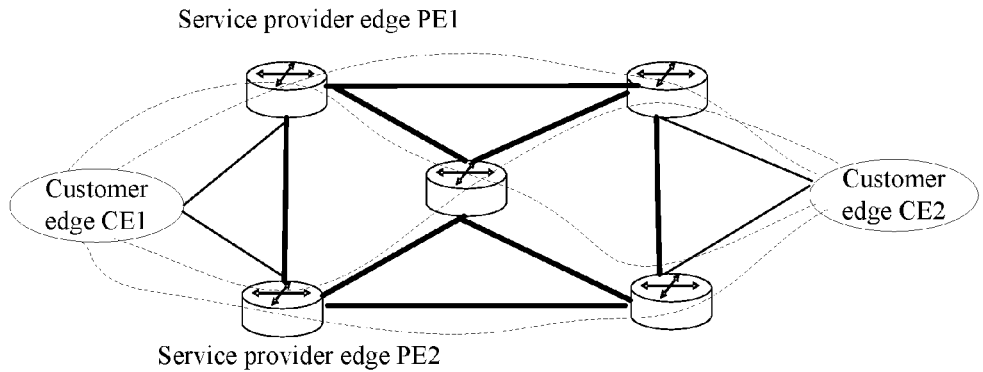
FIG. 1 is a diagram of a networking structure in a multipath transmission scenario.

A networking structure in a multipath transmission scenario is shown in FIG. 1, and FIG. 1 is a networking structure of CE (Customer Edge) dual-homing. The CE dual-homing refers to that one CE device is homed to two PE (Provider Edge) devices simultaneously. Source node CE1 is homed to a PE1 and a PE2 simultaneously, and user traffic transmitted through source node CE1 to destination node CE2 needs to pass through four forwarding paths.

S102: Determine, according to a preconfigured mapping relationship between traffic ranges and forwarding paths, a target forwarding path set corresponding to the egress traffic of the data packet set, and a weight parameter of the egress traffic borne on each target forwarding path in the target forwarding path set.

Specifically, a mapping relationship between traffic ranges and forwarding paths is preconfigured; it is determined which traffic range the egress traffic monitored in S101 falls into; and a target forwarding path set corresponding to the traffic range is determined according to the mapping relationship. If there is only one target forwarding path in the target forwarding path set, a weight parameter of the target forwarding path is 100%, and the entire egress traffic is transferred to the destination node by the target forwarding path; if there are multiple target forwarding paths in the target forwarding path set, the egress traffic is transferred preferentially by a target forwarding path of high path forwarding quality, and a weight parameter of each target forwarding path is determined according to a ratio of traffic borne on each target forwarding path set to the egress traffic; and the traffic borne on each target forwarding path does not exceed maximum bearable traffic of each target forwarding path.

It is assumed that there are three forwarding paths, which are A, B, and C, between the source node and the destination node, and the preconfigured mapping relationship between traffic ranges and forwarding paths is:

traffic range 1 (0<L<10 Gbps) is corresponding to forwarding path A;

traffic range 2 (10 Gbps≤L<20 Gbps) is corresponding to forwarding paths A and B; and traffic range 3 (20 Gbps≤L≤25 Gbps) is corresponding to forwarding paths A, B, and C.

Maximum bearable traffic of A is 10 Gbps, maximum bearable traffic of B is 10 Gbps, maximum bearable traffic of C is 5 Gbps, and a relationship of path forwarding quality is A>B>C. Assuming that in S101, the egress traffic, which is monitored at a time, of the data packet set of the source node is 8 Gbps, a target forwarding path set corresponding to the egress traffic of the data packet set is {A}. Because there is only one target forwarding path in the target forwarding path set, in this case, A bears the entire egress traffic, that is, the weight parameter is 100%. Assuming that the egress traffic, which is monitored at a time, of the data packet set sent by the source node is 15 Gbps, target forwarding path set corresponding to the egress traffic of the data packet set is {A B}. In this case, A bears 10 Gbps traffic of the egress traffic, and B bears 5 Gbps traffic of the egress traffic, that is, the weight parameter of the egress traffic borne on target forwarding path A is 10/(10+5)=66.7%, and the weight parameter of the egress traffic borne on target forwarding path B is 5/(10+5)=33.3%. Assuming that the egress traffic, which is monitored at a time, of the data packet set sent by the source node is 25 Gbps, target forwarding path set corresponding to the egress traffic of the data packet set is {A B C}. In this case, A bears 10 Gbps traffic of the egress traffic, B bears 10 Gbps traffic of the egress traffic, and C bears 5 Gbps traffic of the egress traffic, that is, the weight parameter of the egress traffic borne on target forwarding path A is 10/(10+10+5)=40%, the weight parameter of the egress traffic borne on target forwarding path B is 10/(10+10+5)=40%, and the weight parameter of the egress traffic borne on target forwarding path C is 5/(10+10+5)=20%.

S103: Distribute the data packet set according to the weight parameter, and transfer the data packet set to a destination node by the target forwarding path set.

Specifically, that the target forwarding path set in S102 is {A B} is used as an example, 66.7% of the egress traffic of the data packet set is distributed to target forwarding path A and transferred to the destination node, and 33.3% of the egress traffic of the data packet set is distributed to target forwarding path B and transferred to the destination node.

During implementation of this embodiment of the present application, in a multipath scenario, statistics about egress traffic of a data packet set sent by a source node is collected; a weight parameter of the egress traffic is determined according to a preconfigured mapping relationship between traffic ranges and forwarding paths; and the data packet set is redistributed to a corresponding target forwarding path according to the weight parameter, so that policing and classification of packet traffic in the multipath scenario is implemented.

Figure 3:
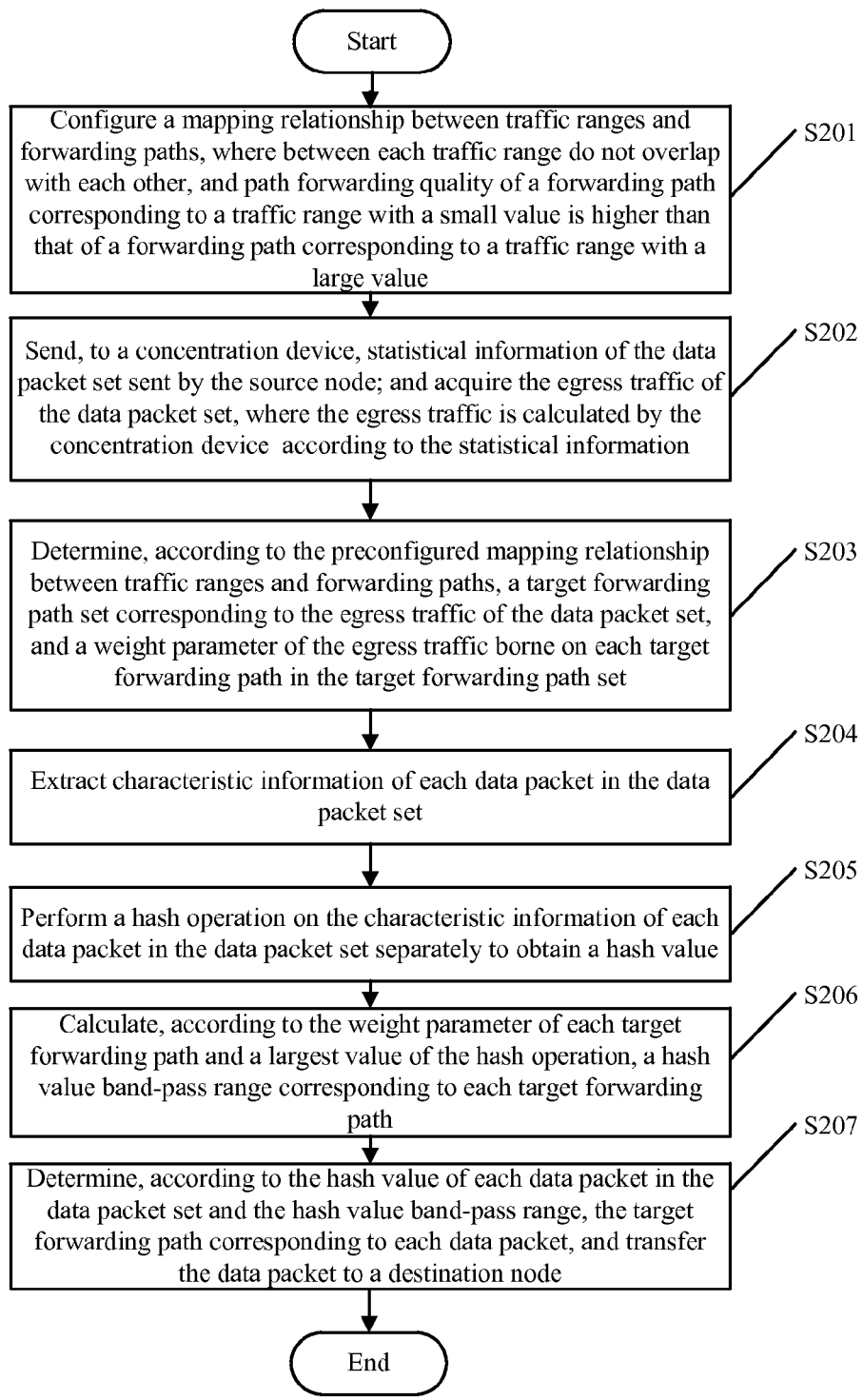
FIG. 3 is another schematic flowchart of a multipath transmission based packet traffic control method according to an embodiment of the present application.

FIG. 3 is another schematic flowchart of a multipath transmission based packet traffic control method according to an embodiment of the present application, where the method includes:

S201: Configure a mapping relationship between traffic ranges and forwarding paths, where traffic ranges do not overlap between each other, and path forwarding quality of a forwarding path corresponding to a traffic range with a small value is higher than that of a forwarding path corresponding to a traffic range with a large value.

Specifically, it is assumed that there are three forwarding paths, which are A, B, and C, between a source node and a destination node, and the preconfigured mapping relationship between traffic ranges and forwarding paths is:

traffic range 1 (0<L<10 Gbps) is corresponding to forwarding path A;

traffic range 2 (10 Gbps≤L<20 Gbps) is corresponding to forwarding paths A and B; and traffic range 3 (20 Gbps≤L≤25 Gbps) is corresponding to forwarding paths A, B, and C.

Traffic range 1, traffic range 2, and traffic range 3 do not overlap with each other, a value of traffic range 1 is less than that of traffic range 2, path forwarding quality of forwarding path A corresponding to traffic range 1 is higher than that of forwarding path B corresponding to traffic range 2, path forwarding quality of forwarding path B corresponding to traffic range 2 is higher than that of forwarding path C corresponding to traffic range 3, and the path forwarding quality includes a path length, a delay parameter, a jitter parameter, and the like.

S202: Send, to a concentration device, statistical information of a data packet set sent by a source node; and acquire egress traffic of the data packet set, where the egress traffic of the data packet set is calculated by the concentration device according to the statistical information.

Specifically, the statistical information includes a length of the data packet set and a time used to collect statistics, the statistical information of the data packet set sent by each output port of the source node is sent to the concentration device, the egress traffic of the source node is calculated by the concentration device according to the length of the data packet set and the time used to collect statistics, and a transmission frequency depends on a processing capability of the concentration device. Optionally, the concentration device may be a logical concentration point implemented by multiple devices. If the egress traffic of the data packet set sent by the source node is greater than rated traffic between the source node and the destination node, a data packet, exceeding the rated traffic, in the data packet set is discarded.

It can be seen from the mapping relationship configured in S201 that the rated traffic between the source node and the destination node is 25 Gbps. If the monitored egress traffic of the data packet set sent by the source node is 30 Gbps, a traffic control apparatus may discard 5 Gbps of the data packet set to meet a requirement on the rated traffic.

S203: Determine, according to the preconfigured mapping relationship between traffic ranges and forwarding paths, a target forwarding path set corresponding to the egress traffic of the data packet set, and a weight parameter of the egress traffic borne on each target forwarding path in the target forwarding path set.

Specifically, assuming that in S201, the egress traffic, which is monitored at a time, of the data packet set of the source node is 8 Gbps, a target forwarding path set corresponding to the egress traffic of the data packet set is {A}. Because there is only one target forwarding path in the target forwarding path set, in this case, A bears the entire egress traffic, that is, the weight parameter is 100%. Assuming that the egress traffic, which is monitored at a time, of the data packet set sent by the source node is 15 Gbps, target forwarding path set corresponding to the egress traffic of the data packet set is {A B}. In this case, A bears 10 Gbps traffic of the egress traffic, and B bears 5 Gbps traffic of the egress traffic, that is, the weight parameter of the egress traffic borne on target forwarding path A is 10/(10+5)=66.7%, and the weight parameter of the egress traffic borne on target forwarding path B is 5/(10+5)=33.3%. Assuming that the egress traffic, which is monitored at a time, of the data packet set sent by the source node is 25 Gbps, target forwarding path set corresponding to the egress traffic of the data packet set is {A, B C}. In this case, A bears 10 Gbps traffic of the egress traffic, B bears 10 Gbps traffic of the egress traffic, and C bears 5 Gbps traffic of the egress traffic, that is, the weight parameter of the egress traffic borne on target forwarding path A is 10/(10+10+5)=40%, the weight parameter of the egress traffic borne on target forwarding path B is 10/(10+10+5)=40%, and the weight parameter of the egress traffic borne on target forwarding path C is 5/(10+10+5)=20%.

S204: Extract characteristic information of each data packet in the data packet set.

Specifically, the characteristic information of the data packet includes header information of the data packet and/or load information of the data packet. The characteristic information distinguishes each data packet, and different data packets have different characteristic information.

S205: Perform a hash operation on the characteristic information of each data packet in the data packet set separately to obtain a hash value.

Specifically, assuming that there are 10000 data packets in the data packet set, and the hash operation is performed on the characteristic information of the 10000 data packets separately, for each data packet, a corresponding hash value is obtained. Assuming a result of the hash operation is a 16-digit binary number, and a maximum value of the result is 65535. According to a characteristic of a hash algorithm, different inputs result in an output of a fixed length by means of the hash operation, and after the hash operation, the data packet set is hashed, that is, the hash values corresponding to the 10000 data packets are evenly distributed between 0 and 65535. It can be understood that the present application imposes no limitations to an algorithm of the hash operation, and message digest algorithm version 4 (Message Digest Algorithm version 4, MD4), message digest algorithm version 5 (Message Digest Algorithm version 5, MD5) or secure hash algorithm (Secure Hash Algorithm) SHA1 may be used, and another algorithm may also be used.

S206: Calculate, according to the weight parameter of each target forwarding path and a maximum value of the hash operation, a hash value band-pass range corresponding to each target forwarding path.

Specifically, assuming that the determined target forwarding paths are A and B, the weight parameter of A is 66.7%, the weight parameter of B is 33.3%, and the maximum value of the hash operation is 65535, the calculated hash value band-pass range of A is from 0 to 66.7%*65535=43690, that is, 0-43690, and the calculated hash value band-pass range of B is 43691-65535. Assuming that the determined target forwarding paths are A, B, and C, the weight parameter of A is 40%, the weight parameter of B is 40%, the weight parameter of C is 20%, and the maximum value of the hash operation is 65535, the calculated hash value band-pass range of A is from 0 to 40%*65535=26214, that is, 0-26214, the calculated hash value band-pass range of B is 26215-52428, and the calculated hash value band-pass range of C is 52429-65535.

S207: Determine, according to the hash value of each data packet in the data packet set and the hash value band-pass range, the target forwarding path corresponding to each data packet, and transfer the data packet set to a destination node.

Specifically, assuming that the determined target forwarding paths are A and B, the calculated hash value band-pass range of A is 0-43690, the calculated hash value band-pass range of B is 43691-65535, and a hash value of a data packet in the data packet set is 23098, the hash value belongs to the hash value band-pass range of target forwarding path A, and the data packet is sent to the destination node by target forwarding path A; and if the hash value of the data packet is 53713, the data packet belongs to the hash value band-pass range of target forwarding path B, and the data packet is sent to the destination node by target forwarding path B.

During implementation of the embodiment of the present application, in a multipath scenario, statistics about egress traffic of a data packet set sent by a source node is collected; a weight parameter of the egress traffic is determined according to a preconfigured mapping relationship between traffic ranges and forwarding paths; and the data packet set is redistributed to a corresponding target forwarding path according to the weight parameter, so that policing and classification of packet traffic in the multipath scenario is implemented.

Figure 4:
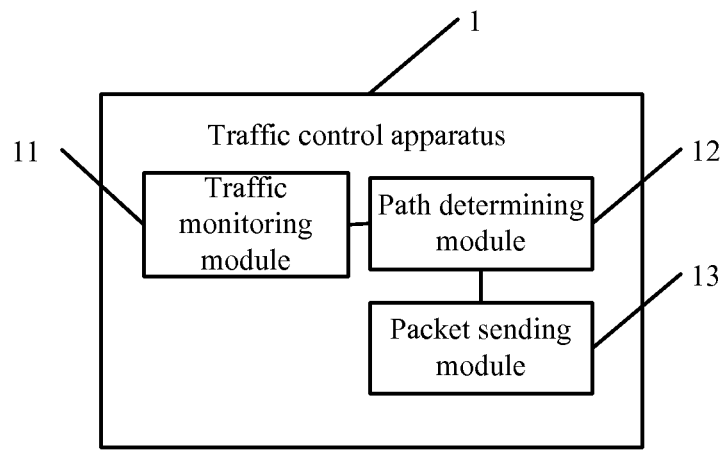
FIG. 4 is a schematic structural diagram of a multipath transmission based packet traffic control apparatus according to an embodiment of the present application.

FIG. 4 is a schematic structural diagram of a multipath transmission based packet traffic control apparatus according to an embodiment of the present application, which is hereinafter referred to as a traffic control apparatus 1, and the traffic control apparatus 1 includes:

A traffic monitoring module 11 is configured to monitor egress traffic of a data packet set sent by a source node.

Specifically, there are multiple forwarding paths between the source node and a destination node; the source node sends a data packet of a user to the destination node by the multiple forwarding paths; the source node correspondingly has multiple output ports; and the traffic monitoring module 11 monitors traffic of data packet sets sent by the multiple output ports of the source node, and obtains egress traffic of the data packet sets by adding the traffic of each output port.

A path determining module 12 is configured to determine, according to a preconfigured mapping relationship between traffic ranges and forwarding paths, a target forwarding path set corresponding to the egress traffic of the data packet set, and a weight parameter of the egress traffic borne on each target forwarding path in the target forwarding path set.

Specifically, it is assumed that there are three forwarding paths, which are A, B, and C, between a source node and a destination node, and the preconfigured mapping relationship between traffic ranges and forwarding paths is:

traffic range 1 (0<L<10 Gbps) is corresponding to forwarding path A;

traffic range 2 (10 Gbps≤L<20 Gbps) is corresponding to forwarding paths A and B; and traffic range 3 (20 Gbps≤L≤25 Gbps) is corresponding to forwarding paths A, B, and C.

The egress traffic, which is monitored by the traffic monitoring module 11 at a time, of the data packet set of the source node is 8 Gbps, the path determining module 12 determines that a target forwarding path set corresponding to the egress traffic of the data packet set is {A}. Because there is only one target forwarding path in the target forwarding path set, in this case, A bears the entire egress traffic, that is, the weight parameter is 100%. Assuming that the egress traffic, which is monitored by the traffic monitoring module 11 at a time, of the data packet set sent by the source node is 15 Gbps, the path determining module 12 determines that target forwarding path set corresponding to the egress traffic of the data packet set is {A B}. In this case, A bears 10 Gbps traffic of the egress traffic, and B bears 5 Gbps traffic of the egress traffic, that is, the weight parameter of the egress traffic borne on target forwarding path A is 10/(10+5)=66.7%, and the weight parameter of the egress traffic borne on target forwarding path B is 5/(10+5)=33.3%. Assuming that the egress traffic, which is monitored by the traffic monitoring module 11 at a time, of the data packet set sent by the source node is 25 Gbps, the path determining module 12 determines that target forwarding path set corresponding to the egress traffic of the data packet set is {A B C}. In this case, A bears 10 Gbps traffic of the egress traffic, B bears 10 Gbps traffic of the egress traffic, and C bears 5 Gbps traffic of the egress traffic, that is, the weight parameter of the egress traffic borne on target forwarding path A is 10/(10+10+5)=40%, the weight parameter of the egress traffic borne on target forwarding path B is 10/(10+10+5)=40%, and the weight parameter of the egress traffic borne on target forwarding path C is 5/(10+10+5)=20%.

A packet sending module 13 is configured to distribute the data packet set according to the weight parameter, and transfer the data packet set to a destination node by the target forwarding path set.

Specifically, that the target forwarding path set determined by the path determining module 12 is {A B} is used as an example, the packet sending module 13 distributes 66.7% of the egress traffic of the data packet set to target forwarding path A, and transfers the egress traffic to the destination node; and the packet sending module 13 distributes 33.3% of the egress traffic of the data packet set to target forwarding path B, and transfers the egress traffic to the destination node.

During implementation of this embodiment of the present application, in a multipath scenario, statistics about egress traffic of a data packet set sent by a source node is collected; a weight parameter of the egress traffic is determined according to a preconfigured mapping relationship between traffic ranges and forwarding paths; and the data packet set is redistributed to a corresponding target forwarding path according to the weight parameter, so that policing and classification of packet traffic in the multipath scenario is implemented.

Figure 5:
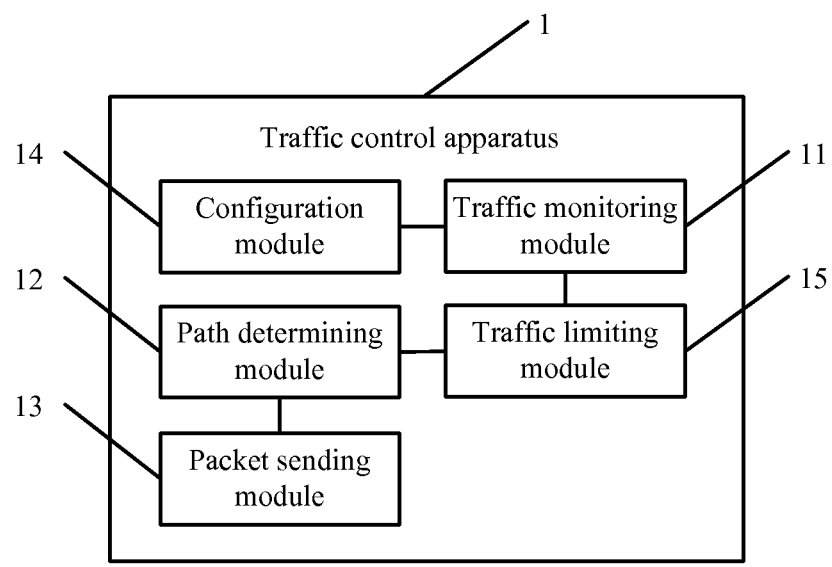
FIG. 5 is another schematic structural diagram of a multipath transmission based packet traffic control apparatus according to an embodiment of the present application.
Figure 6:
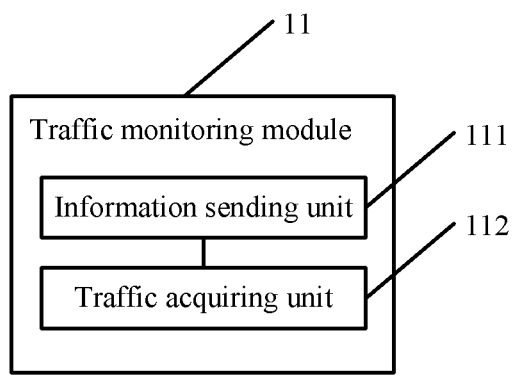
FIG. 6 is a schematic structural diagram of a traffic monitoring module in FIG. 5.
Figure 7:
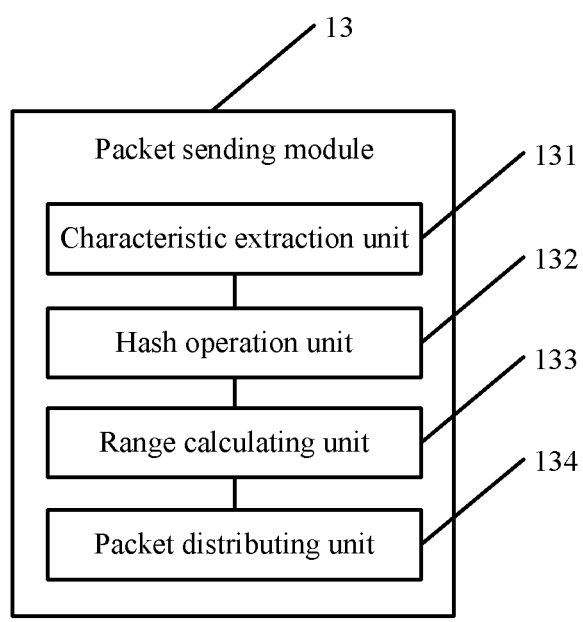
FIG. 7 is a schematic structural diagram of a packet sending module in FIG. 5.

Further, FIG. 5 to FIG. 7 are other schematic structural diagrams of a multipath transmission based packet traffic control apparatus according to an embodiment of the present application. In addition to a traffic monitoring module 11, a path determining module 12, and a packet sending module 13, the traffic control apparatus 1 further includes:

A configuration module 14 is adapted to configure a mapping relationship between traffic ranges and forwarding paths, where traffic ranges do not overlap between each other, and path forwarding quality of a forwarding path corresponding to a traffic range with a small value is higher than that of a forwarding path corresponding to a traffic range with a large value.

Specifically, it is assumed that there are three forwarding paths, which are A, B, and C, between a source node and a destination node, and the mapping relationship, configured by the configuration module 14, between traffic ranges and forwarding paths is:

traffic range 1 (0<L<10 Gbps) is corresponding to forwarding path A;

traffic range 2 (10 Gbps≤L<20 Gbps) is corresponding to forwarding paths A and B; and traffic range 3 (20 Gbps≤L≤25 Gbps) is corresponding to forwarding paths A, B, and C.

Traffic range 1, traffic range 2, and traffic range 3 do not overlap with each other, a value of traffic range 1 is less than that of traffic range 2, path forwarding quality of forwarding path A corresponding to traffic range 1 is higher than that of forwarding path B corresponding to traffic range 2, path forwarding quality of forwarding path B corresponding to traffic range 2 is higher than that of forwarding path C corresponding to traffic range 3, and the path forwarding quality includes a path length, a delay parameter, a jitter parameter, and the like.

A traffic limiting module 15 is configured to discard, if the egress traffic of the data packet set sent by the source node is greater than rated traffic between the source node and the destination node, a data packet, exceeding the rated traffic, in the data packet set.

Specifically, it is assumed that the rated traffic between the source node and the destination node is 25 Gbps. If the monitored egress traffic of the data packet set sent by the source node is 30 Gbps, the traffic limiting module 15 may discard 5 Gbps of the data packet set to meet a requirement on the rated traffic.

Preferably, the traffic monitoring module 11 includes:

an information sending unit 111, configured to send, to a concentration device, statistical information of the data packet set sent by the source node; and a traffic acquiring unit 112, configured to acquire the egress traffic of the data packet set, where the egress traffic of the data packet set is calculated by the concentration device according to the statistical information.

The packet sending module 13 includes:

a characteristic extraction unit 131, configure to extract characteristic information of each data packet in the data packet set;

a hash operation unit 132, configured to perform a hash operation on the characteristic information of each data packet in the data packet set separately to obtain a hash value;

a range calculating unit 133, configured to calculate, according to the weight parameter of each target forwarding path and a maximum value of the hash operation, a hash value band-pass range corresponding to each target forwarding path; and a packet classification unit 134, configured to determine, according to the hash value of each data packet in the data packet set and the hash value band-pass range, the target forwarding path corresponding to each data packet, and transfer each data packet to the destination node.

During implementation of this embodiment of the present application, in a multipath scenario, statistics about egress traffic of a data packet set sent by a source node is collected; a weight parameter of the egress traffic is determined according to a preconfigured mapping relationship between traffic ranges and forwarding paths; and the data packet set is redistributed to a corresponding target forwarding path according to the weight parameter, so that policing and classification of packet traffic in the multipath scenario is implemented.

Figure 8:
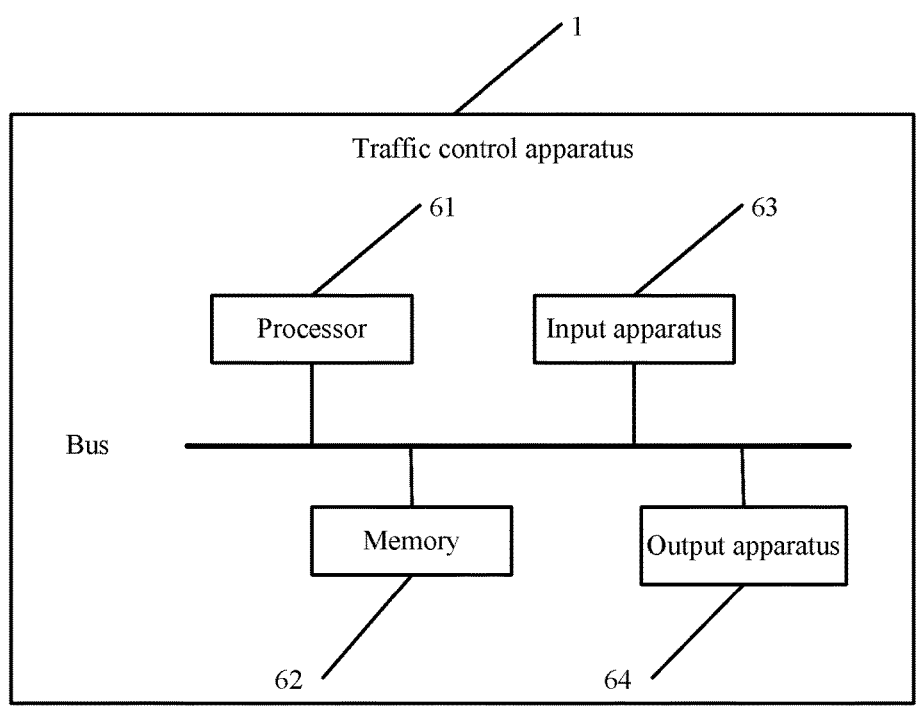
FIG. 8 is another schematic structural diagram of a multipath transmission based packet traffic control apparatus according to an embodiment of the present application.

FIG. 8 is another schematic structural diagram of a multipath transmission based packet traffic control apparatus according to an embodiment of the present application. The traffic control apparatus 1 includes a processor 61, a memory 62, an input apparatus 63, and an output apparatus 64. The traffic control apparatus 1 may include one or more processors 61, and one processor is used as an example in FIG. 8. In some embodiments of the present application, the processor 61, the memory 62, the input apparatus 63, and the output apparatus 64 may be connected by using a bus or in another manner, and a bus-based connection is used as an example in FIG. 8.

A set of program code is stored in the memory 62, and the processor 61 is configured to call the program code stored in the memory 62 to perform the following operations:

monitoring egress traffic of a data packet set sent by a source node;

determining, according to a preconfigured mapping relationship between traffic ranges and forwarding paths, a target forwarding path set corresponding to the egress traffic of the data packet set, and a weight parameter of the egress traffic borne on each target forwarding path in the target forwarding path set; and distributing the data packet set according to the weight parameter, and transferring the data packet set to a destination node by the target forwarding path set.

In some embodiments of the present application, that the processor 61 performs the monitoring egress traffic of a data packet set sent by a source node includes:

sending, to a concentration device, statistical information of the data packet set sent by the source node; and acquiring the egress traffic of the data packet set, where the egress traffic of the data packet set is calculated by the concentration device according to the statistical information.

In some embodiments of the present application, the processor 61 is further configured to perform configuring the mapping relationship between traffic ranges and forwarding paths, where traffic ranges do not overlap between each other, and path forwarding quality of a forwarding path corresponding to a traffic range with a small value is higher than that of a forwarding path corresponding to a traffic range with a large value.

In some embodiments of the present application, that the processor 61 performs the distributing the data packet set according to the weight parameter, and transferring the data packet set to a destination node by the target forwarding path set includes:

extracting characteristic information of each data packet in the data packet set;

performing a hash operation on the characteristic information of each data packet in the data packet set separately to obtain a hash value;

calculating, according to the weight parameter of each target forwarding path and a maximum value of the hash operation, a hash value band-pass range corresponding to each target forwarding path; and determining, according to the hash value of each data packet in the data packet set and the hash value band-pass range, the target forwarding path corresponding to each data packet.

In some embodiments of the present application, the processor 61 is further configured to perform discarding, if the egress traffic of the data packet sent by the source node is greater than rated traffic between the source node and the destination node, a data packet, exceeding the rated traffic, in the data packet set.

During implementation of this embodiment of the present application, in a multipath scenario, statistics about egress traffic of a data packet set sent by a source node is collected; a weight parameter of the egress traffic is determined according to a preconfigured mapping relationship between traffic ranges and forwarding paths; and the data packet set is redistributed to a corresponding target forwarding path according to the weight parameter, so that policing and classification of packet traffic in the multipath scenario is implemented.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), a random access memory (Random Access Memory, RAM), or the like.

What is disclosed above is merely exemplary embodiments of the present application, and certainly is not intended to limit the protection scope of the present application. A person of ordinary skill in the art may understand that all or some of processes that implement the foregoing embodiments and equivalent modifications made in accordance with the claims of the present application shall fall within the scope of the present application.

What is claimed is:

1. A multipath transmission based packet traffic control method, comprising:

configuring a mapping relationship between traffic ranges and forwarding paths, wherein the traffic ranges do not overlap between each other, and path forwarding quality of a forwarding path corresponding to a traffic range with a small value is higher than that of a forwarding path corresponding to a traffic range with a large value;

monitoring egress traffic of a data packet set sent by a source node;

determining, according to the mapping relationship between traffic ranges and forwarding paths, a target forwarding path set corresponding to the egress traffic of the data packet set, and a weight parameter of the egress traffic borne on each target forwarding path in the target forwarding path set; and distributing the data packet set according to the weight parameter, and transferring the data packet set to a destination node by the target forwarding path set.

2. The method according to claim 1, wherein the monitoring egress traffic of a data packet set sent by a source node comprises:

sending, to a concentration device, statistical information of the data packet set sent by the source node; and acquiring the egress traffic of the data packet set, wherein the egress traffic of the data packet set is calculated by the concentration device according to the statistical information.

3. A multipath transmission based packet traffic control method, comprising:

monitoring egress traffic of a data packet set sent by a source node;

determining, according to a preconfigured mapping relationship between traffic ranges and forwarding paths, a target forwarding path set corresponding to the egress traffic of the data packet set, and a weight parameter of the egress traffic borne on each target forwarding path in the target forwarding path set; and distributing the data packet set according to the weight parameter, and transferring the data packet set to a destination node by the target forwarding path set, wherein the distributing the data packet set according to the weight parameter, and transferring the data packet set to a destination node by the target forwarding path set comprises:

extracting characteristic information of each data packet in the data packet set;

performing a hash operation on the characteristic information of each data packet in the data packet set separately to obtain a hash value;

calculating, according to the weight parameter of each target forwarding path and a maximum value of the hash operation, a hash value band-pass range corresponding to each target forwarding path; and determining, according to the hash value of each data packet in the data packet set and the hash value band-pass range, the target forwarding path corresponding to each data packet.

4. The method according to claim 3, wherein the characteristic information of the data packet comprises header information of the data packet and/or load information of the data packet.

5. The method according to claim 4, further comprising:
discarding, if the egress traffic of the data packet set sent by the source node is greater than rated traffic between the source node and the destination node, a data packet, exceeding the rated traffic, in the data packet set.

6. A multipath transmission based packet traffic control apparatus, comprising:
a processor; and
a memory storing instructions;
the processor is configured to execute the instructions to implement a method comprising:
configuring a mapping relationship between traffic ranges and forwarding paths, wherein the traffic ranges do not overlap between each other, and path forwarding quality of a forwarding path corresponding to a traffic range with a small value is higher than that of a forwarding path corresponding to a traffic range with a large value;
monitoring egress traffic of a data packet set sent by a source node;
determining, according to the mapping relationship between traffic ranges and forwarding paths, a target forwarding path set corresponding to the egress traffic of the data packet set, and a weight parameter of the egress traffic borne on each target forwarding path in the target forwarding path set; and
distributing the data packet set according to the weight parameter, and transfer the data packet set to a destination node by the target forwarding path set.

7. The apparatus according to claim 6, the processor is configured to execute the instructions to implement a method further comprising:
sending, to a concentration device, statistical information of the data packet set sent by the source node; and
acquiring the egress traffic of the data packet set, wherein the egress traffic of the data packet set is calculated by the concentration device according to the statistical information.

8. A multipath transmission based packet traffic control apparatus, comprising:
a processor; and
a memory storing instructions;
the processor is configured to execute the instructions to implement a method comprising:
monitoring egress traffic of a data packet set sent by a source node;
determining, according to a preconfigured mapping relationship between traffic ranges and forwarding paths, a target forwarding path set corresponding to the egress traffic of the data packet set, and a weight parameter of the egress traffic borne on each target forwarding path in the target forwarding path set;
distributing the data packet set according to the weight parameter, and transfer the data packet set to a destination node by the target forwarding path set,
extracting characteristic information of each data packet in the data packet set;
performing a hash operation on the characteristic information of each data packet in the data packet set separately to obtain a hash value;
calculating, according to the weight parameter of each target forwarding path and a maximum value of the hash operation, a hash value band-pass range corresponding to each target forwarding path; and
determining, according to the hash value of each data packet in the data packet set and the hash value band-pass range, the target forwarding path corresponding to each data packet, and transfer each data packet to the destination node.

9. The apparatus according to claim 8, wherein the characteristic information of the data packet comprises header information of the data packet and/or load information of the data packet.

10. The apparatus according to claim 9, the processor is configured to execute the instructions to implement a method further comprising:
discarding, if the egress traffic of the data packet set sent by the source node is greater than rated traffic between the source node and the destination node, a data packet, exceeding the rated traffic, in the data packet set.

* * * * *